United States Patent [19]

Johnson et al.

[11] Patent Number: 5,275,887
[45] Date of Patent: * Jan. 4, 1994

[54] FLUOROPOLYMER COMPOSITIONS

[75] Inventors: Rodger G. Johnson, Boca Raton, Fla.; Carl J. Weber, Redwood City, Calif.

[73] Assignee: Raychem Corporation, Menlo Park, Calif.

[ * ] Notice: The portion of the term of this patent subsequent to Apr. 28, 2009 has been disclaimed.

[21] Appl. No.: 834,023

[22] Filed: Feb. 11, 1992

Related U.S. Application Data

[63] Continuation of Ser. No. 763,480, Sep. 20, 1991, Pat. No. 5,109,071, which is a continuation of Ser. No. 602,907, Oct. 10, 1990, abandoned, which is a continuation of Ser. No. 246,885, Sep. 15, 1988, abandoned, which is a continuation of Ser. No. 32,211, Mar. 30, 1987, abandoned, which is a continuation-in-part of Ser. No. 885,025, Apr. 22, 1986, abandoned.

[51] Int. Cl.$^5$ .................. C08L 27/16; B32B 27/28
[52] U.S. Cl. .................... 428/422; 428/378; 428/379; 525/199; 525/194; 525/193
[58] Field of Search ............... 428/422, 378; 525/199, 525/194, 193

[56] References Cited

U.S. PATENT DOCUMENTS

| | | | |
|---|---|---|---|
| 3,723,577 | 3/1973 | Stivers | 260/900 |
| 3,769,371 | 10/1973 | Nersasian | 260/900 |
| 3,864,228 | 2/1975 | Rossetti | 204/159.2 |
| 4,094,949 | 6/1978 | Yokokawa et al. | 264/234 |
| 4,200,568 | 4/1980 | Trautvetter et al. | 525/199 |
| 4,487,882 | 12/1984 | Ueta et al. | 525/88 |
| 4,530,970 | 7/1985 | Morozumi et al. | 525/199 |
| 4,530,971 | 7/1985 | Geri et al. | 525/193 |
| 4,560,737 | 12/1985 | Yamamoto et al. | 525/88 |
| 4,612,351 | 9/1986 | Caporiccio et al. | 525/199 |

FOREIGN PATENT DOCUMENTS

| | | |
|---|---|---|
| 1277067 | 4/1985 | Canada . |
| 168020 | 1/1986 | European Pat. Off. . |
| 0203457 | 5/1986 | European Pat. Off. . |
| 52-027597 | 3/1977 | Japan . |

*Primary Examiner*—Carman J. Seccuro, Jr.
*Attorney, Agent, or Firm*—Sheri M. Novack; Herbert G. Burkard

[57] ABSTRACT

A composition comprising (a) a vinylidene fluoride-hexafluoropropylene thermoplastic copolymer and (b) a fluoroelastomer, such as vinylidene fluoride-hexafluoropropylene elastomeric copolymer, at least one of (a) and (b) being cross-linked, exhibits excellent physical properties. The composition is particularly useful in the form of a heat recoverable article or as wire and cable insulation.

6 Claims, No Drawings

FLUOROPOLYMER COMPOSITIONS

This application is a continuation of application Ser. No. 07/763,480 filed Sep. 20, 1991, now U.S. Pat. No. 5,109,071, which is a continuation of application Ser. No. 602,907 filed Oct. 10, 1990, now abandoned, which is a continuation of application Ser. No. 246,885 filed on Sep. 15, 1988, now abandoned, which is a continuation of application Ser. No. 032,211 filed Mar. 30, 1987, now abandoned, which is a continuation-in-part of application Ser. No. 885,025 filed Apr. 22, 1986, now abandoned.

BACKGROUND OF THE INVENTION

This invention relates to an irradiated fluoropolymer composition, to heat recoverable articles comprising said composition and to an elongate conductor insulated with said composition.

Thermoplastic polymers of vinylidene fluoride have desirable properties, such as fluid resistance, which make them suitable for various uses such as wire and cable insulation and heat shrinkable tubing. In using thermoplastic vinylidene fluoride polymers in such application, the polymer may be cross-linked, for example by irradiation as described in U.S. Pat. No. 3,580,829 to Lanza, the disclosure of which is incorporated herein by reference. However, thermoplastic vinylidene fluoride polymers in general, have been found to be too stiff and/or too brittle, particularly at temperatures below $-20°$ C., and to have relatively poor elongation.

It has been suggested that vinylidene fluoride polymers, in particular a copolymer of vinylidene fluoride containing about 5% by weight tetrafluoroethylene, be blended with an elastomeric vinylidene fluoride-hexafluoroprooylene copolymer to improve the physical properties. See U.S. Pat. No. 3,864,228 to Rossetti. However, as reported in that patent, while the resulting composition may have certain improved properties, such as tensile strength and elongation, the resulting composition has relatively poor heat aging properties. Further, while the elongation is somewhat improved it is still too low for certain uses.

Subsequent work on vinylidene fluoride-tetrafluoroethylene thermoplastic copolymers, as reported in more detail below, supports the conclusion that the addition thereto of an elastomeric vinylidene fluoride-hexafluoropropylene copolymer undesirably and uncontrollably lowers the secant modulus. In certain compositions, depending on the secant modulus of the particular vinylidene fluoride polymer used, the modulus may be too high and elongation too low for use of the composition in preparing flexible heat shrinkable tubing and in others, the modulus may be too low to prepare satisfactory heat shrinkable tubing.

Blends of vinylidene fluoride polymers with the fluoro-polymers for other uses are known. See for example U.S. Pat. No. 4,560,737 to Yamamoto et al which relates to piezoelectric materials. Yamamoto et al disclose blends of a vinylidene fluoride base resin, for example vinylidene fluoride homopolymer or copolymers with, for example, tetrafluoroethylene, hexafluoropropylene, or hexafluorobutylene, and a modified fluoroelastomer. The fluoroelastomer is block or graft copolymerized with vinylidene fluoride monomer or a vinylidene fluoride containing monomer mixture. The blend can be used to form a sheet or film having a high piezoelectric modulus.

Our invention provides a cross-linked vinylidene fluoride based polymer composition which possesses the desirable properties of polyvinylidene fluoride yet has a secant modulus and elongation making it suitable for use in preparing flexible heat recoverable articles and as insulation for wire and cable.

SUMMARY OF THE INVENTION

One aspect of this invention comprises a composition comprising (a) a vinylidene fluoride hexafluoropropylene thermoplastic copolymer and (b) a fluoroelastomer, at least one of (a) and (b) being cross-linked.

The composition preferably contains about 5 to about 95% by weight of the thermoplastic copolymer and about 95 to about 5% by weight of the fluoroelastomer based on the total weight of the thermoplastic and fluoroelastomer components.

Another aspect of the invention comprises a heat-recoverable article made from said composition.

A further aspect of the invention comprises an elongate electrical conductor insulated with said composition.

DETAILED DESCRIPTION OF THE INVENTION

The thermoplastic copolymer used in accordance with this invention is a copolymer of vinylidene fluoride and hexafluoropropylene. The term copolymer used in this context includes polymers containing vinylidene fluoride and hexafluoropropylene units and optionally, minor amounts of suitable termonomer units, for example fluoropropylene or perfluoroethoxyethylene units. Vinylidene fluoride preferably is present in the thermoplastic copolymer in an amount of at least about 75 mole per cent and sufficient to give the copolymer a crystallinity of at least about 15%. The thermoplastic copolymer is substantially crystalline and exhibits a thermodynamic melting transition. Preferably the polymer is at least about 15% crystalline, more preferably at least about 25% crystalline.

The fluoroelastomer used is a fluorine-containing polymer which is substantially non-crystalline and when crosslinked exhibits typical rubber properties as set forth in ASTM D883, incorporated herein by reference.

Fluoroelastomers which can be used include, for example, elastomeric copolymers or terpolymers containing one or more of the following monomer units, with the proviso that the polymer contain at least about 20% by weight fluorine: vinylidene fluoride, hexafluoropropylene, tetrafluoroethylene, chlorotrifluoroethylene, ethylene, propylene, perfluoroethoxy ethylene, perfluoromethoxy ethylene and 1-hydropentafluoropropylene. Preferred fluoroelastomers include, for example, a copolymer of vinylidene fluoride and hexafluoropropylene containing about 30 to about 70 mole per cent vinylidene fluoride and conversely about 70 to about 30 mole per cent hexafluoropropylene; a copolymer of propylene and tetralluoroethylene containing about 5 to about 60 mole per cent propylene and conversely about 95 to about 40 mole per cent tetrafluoroethylene; and a terpolymer containing about 45 to about 90 mole per cent vinylidene fluoride, about 5 to about 50 mole per cent hexafluoropropylene and about 10 to about 35 mole per cent tetrafluoroethylene.

The composition preferably contains about 5 to about 95% by weight of the thermoplastic copolymer and about 95 to about 5% by weight of the fluoroelastomer, based on the total weight of the thermoplastic and fluoroelastomer components. More preferably the composition contains about 25 to about 75% by weight of the thermoplastic copolymer and about 75 to about 25% by weight of the fluoroelastomer, based on the total weight of the thermoplastic and fluoroelastomer components.

Various additives can be added to the polymeric composition. Such additives include for example, antioxidants such as alkylated phenols, e.g. those commercially available as Goodrite 3125, Irganox 1010, Irganox 1035, Irganox 1076, Irganox 1093, Vulkanox BKF, organic phosphite or phosphates, e.g. dilauryl phosphite, Mark 1178, alkylidene polyphenols, e.g. Ethanox 330, thio-bis alkylated phenol, e.g. Santonox R, dilauryl thio-dipropionate, e.g. Carstob DLTDP, dimyristyl thiodipropionate, e.g. Carstab DMTDP, distearyl thiodipropionate, e.g. Cyanox STDP, amines, e.g. Wingstay 29 etc; UV stabilizers such as [2,2'-thio-bis(4-t-octylphenolato)] n-butylamine nickel, Cyasorb UV 1084, 3,5-ditertiarybutyl-phydroxybenzoic acid, UV Chek Am-240; flame retardants such as decabromodiphenyl ether, perchloro-pentacyclodecane, 1,2-bis(tetrabromophthalimido) ethylene; pigments such as titanium dioxide, antimony trioxide, zinc oxide, iron oxide, etc; conductive particles such as carbon black, metal powder, metal flakes, etc.; and the like. Mixtures of such additives can be used. If desired, the additives can be added to either o both of the thermoplastic and fluoroelastomer components before they are blended together.

The composition of this invention can be prepared by mixing the thermoplastic copolymer, fluoroelastomer and other components, if any, in any suitable manner such as for example, an internal mixer such as a Banbury or Brabender, a single or twin screw extruder or a mill. Generally, the mixing is done at a temperature above the melting point of the thermoplastic copolymer.

The composition of this invention has numerous uses. In general, the composition has good electrical insulating characteristics but can be made conductive, if desired. The compositions, generally before irradiation thereof, can be formed into shaped articles, coatings or the like by melt processing techniques, such as extrusion, by casting, machining or the like. A preferred use of the composition of this invention is as an insulation for an elongate electrical conductor, such as a wire or cable. Another preferred use of the composition of this invention is in the preparation of heat recoverable articles, particularly articles for use as wire and cable harnessing.

The thermoplastic copolymer or the fluoroelastomer or both are cross-linked. Cross-linking can be achieved by chemical methods or by irradiation as appropriate to the component(s) being cross-linked. Chemical cross-linking comprises the addition of a chemical cross-linking agent, such as a peroxide or amine, to the composition and then heating, generally after the composition has been formed into the desired shaped article.

One or both of the components can be cross-linked by irradiation. The dosage employed in the irradiation step is generally below about 50 Mrads to ensure that the polymer is not degraded by excessive irradiation. The dosage preferably employed depends upon the extent of cross-linking desired, balanced against the tendency of the polymer to be degraded by high doses of irradiation. Suitable dosages are generally in the range 2 to 40 Mrads, for example 2 to 30 Mrads, particularly 5 to 15 Mrads. The ionising radiation can for example be in the form of accelerated electrons or gamma rays. Irradiation is generally carried out at about room temperature, but high temperatures can also be used.

Prior to irradiation it is preferred to incorporate a cross-linking agent into the composition. Preferred radiation cross-linking agents contain carbon-carbon unsaturated groups in a molar percentage greater than 15, especially greater than 20, particularly greater than 25, based on the total molar amount of (A) and (B). In many cases the cross-linking agent contains at least two ethylenic double bonds, which may be present, for example, in allyl, methallyl, propargyl, or vinyl groups. We have obtained excellent results with cross-linking agents containing at least two allyl groups, especially three or four allyl groups. Particularly preferred cross-linking agents are triallyl cyanurate (TAC) and triallyl isocyanurate (TAIC); other specific cross-linking agents include triallyl trimellitate, triallyl trimesate, tetrallyl pyromellitate, the diallyl ester of 1,1,3-trimethyl-5-carboxy-3-(p-carboxyphenyl) indan. Other cross-linking agents which are known for incorporation into fluorocarbon polymers prior to shaping, for example those disclosed in U.S. Pat. Nos. 3,763,222, 3,840,619, 3,894,118, 3,911,192, 3,970,770, 3,985,716, 3,995,091, 4,031,167, 4,155,823 and 4,353,961. Mixtures of cross-linking agents can be used.

A heat recoverable article is one whose dimensionally configuration may be made to change when subjected to an appropriate treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, heat-recoverable articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, while hot, to a dimensionally heat-unstable form but, in other applications, a preformed dimensionally heat stable article is deformed to a dimensionally heat unstable form in a separate stage.

In the production of heat recoverable articles, the polymer material may be cross-linked (as discussed above) at any stage in the production of the article that will enhance the desired dimensional recoverability. One manner of producing a heat-recoverable article comprises shaping the polymeric article into the desired heat-unstable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

The following examples illustrate this invention.

EXAMPLE 1

Sample compositions containing 63.9% of the thermoplastic copolymer, 35.0% of vinylidene fluoride-hexafluoropropylene elastomeric copolymer, (commercially available as VITON AHV from DuPont) 0.1% of calcium carbonate and 1.0% of triallyisocyanurate were prepared by blending the appropriate proportions of the components in a Banbury mixer for 3 minutes at a temperature of about 200° C. Control samples were prepared using the thermoplastic copolymer and excluding the elastomeric copolymer. In samples A (with elastomer) and B (without elastomer), the thermoplastic copolymer used was a vinylidene fluoride-hexafluoropropylene copolymer (commercially available as Kynar Flex 2800 from Pennwalt Corp.). In samples C (with elastomer) and D (without elastomer) the thermoplastic polymer used was a vinylidene fluoride-tetrafluoroethylene cooolymer (commercially available as Kynar 7200 from Pennwalt Corp.) The compositions were pelletized in a pelletizing extruder at about 200° C.

Each sample composition was extruded into tubing 0.125" ID, 0.011" wall thickness. The tubing was irradiated with a total dosage of 3.6 megarads. Each tube was expanded at about 175° C. to an ID of 0.25".

Various physical properties of the samples were measured and reported in Table I. The procedures for preparing heat shrinkable tubing samples and test procedures used are described in ASTM 2671, incorporated herein by reference. That procedure specifies ASTM D412 for tensile and elongation, ASTM D882 for secant modulus (unrecovered tubing is used) and ASTM D746 for brittle temperature testing. Each of these procedures are also incorporated herein by reference.

TABLE I

| | Sample A | Sample B | Sample C | Sample D |
|---|---|---|---|---|
| Tensile (psi) | 4,410 | 7,500 | 4,640 | 6,030 |
| Elongation (%) | 500 | 500 | 510 | 490 |
| Secant Mod. (psi) | 43,000 | 69,000 | 27,000 | 66,000 |
| Brittle Temp. | −36° C. | −23° C. | −41° C. | −34° C. |
| 1 Week Heat Age at 250° C. | | | | |
| Tensile (psi) | 3,270 | 5,070 | 2,700 | 3,990 |
| Elong. (%) | 480 | 410 | 540 | 480 |
| 2 Week Heat Age at 250° C. | | | | |
| Tensile (psi) | 2,500 | 3,900 | 2,270 | 2,610 |
| Elong. (%) | 390 | 330 | 490 | 320 |

As can be seen from these results Sample A, a composition of this invention, exhibits an excellent balance of properties. The secant modulus, while lower than that of a similar composition without the elastomeric copolymer (Sample B), is still in the acceptable range for preparing heat recoverable tubing of the specified wall thickness. The comparative composition Sample C containing a vinylidene fluoride-tetrafluoroethylene copolymer has an unacceptably low modulus for this particular use. Further, Sample A exhibits excellent elongation, tensile, heat aging and low temperature properties.

EXAMPLE 2

Sample compositions containing vinylidene fluoride homopolymer (a thermoplastic polymer commercially available as Kynar 461 from Pennwalt), or a thermoplastic copolymer of vinylidene fluoride and hexafluoropropylene (commercially available as Kynar Flex 2800 from Pennwalt) and an elastomeric copolymer of vinylidene fluoride and hexafluoropropylene (commercially available as Viton AHV from DuPont) as indicated in Table 2, were prepared by mixing in a Banbury mixer for 3 minutes at a temperature of about 200° C. Each composition was then mixed with 0.8% of a peroxide crosslinking agent (Luperco 130, SL commercially available from Lucidol) on a cooled two roll mill. Portions were molded into slabs, 6"×6"×0.075" and cured (cross-linked) by heating at 360° F. for 12 minutes. Tests were performed on these samples according to ASTM procedures. The test results are given in Table 2. Portions of each material were also transfer compression molded into a Y-shaped molded article and cross-linked by heating in the mold for 9 minutes at 360° F. The parts were trimmed and expanded by heating them in a hot inert fluid to 380° F. and forcing them onto lubricated mandrels.

TABLE 2

| Composition | E | F |
|---|---|---|
| Kynar 461 | 23.07 | — |
| Kynar Flex 2800 | — | 23.07 |
| Viton AHV | 52.63 | 52.63 |
| Inorganic Fillers | 12.90 | 12.90 |
| Lubricating Agents | 8.39 | 8.39 |
| Triallylcyanurate | 3.01 | 3.01 |
| TEST RESULTS | | |
| Tensile strength, psi (ASTMD 412) | 2180 | 2410 |
| Elongation, % (ASTMD 412) | 420 | 595 |
| 2% Secant Modulus, psi (ASTMD 882) | 4820 | 3000 |
| Brittle Impact Temperature, % (ASTMD 746) | −28 | −33 |
| Moldability (1 = Best) | 2 | 1 |
| Maximum Expansion Ratio* | 2.6 | 3.0 |

*Expansion ratio = $\dfrac{\text{diameter of mandrel}}{\text{molded diameter of opening at one branch of Y}}$ Sample F, the composition of this invention, has improved room temperature and low temperature flexibility over the comparitive composition.

EXAMPLE 3

Sample compositions containing a thermoplastic copolymer of vinylidene fluoride and hexafluoropropylene (Kynar Flex 2800), and an elastomeric terpolymer of vinylidene fluoride, hexafluoropropylene and tetrafluoroethylene (commercially available as VITON B from DuPont) or an elastomeric copolymer of propylene and tetrafluoroethylene (commercially available as Aflas TIDE M from Asahi Glass) as indicated in Table 3, were prepared by mixing on a mill at a temperature of about 180° C. Compositions were then molded into slabs 6"×6" by 0.075" and crosslinked by exposure to 5 Megarads of radiation from an electron beam.

TABLE 3

| | G | H | I | J | K |
|---|---|---|---|---|---|
| Composition | | | | | |
| Kynar 2800 | 98.9 | 68.9 | 38.9 | 68.9 | 38.9 |
| Viton B-50 | — | 30.0 | 60.0 | — | — |
| Aflas TIDEM | — | — | — | 30.0 | 60.0 |
| CaCO$_3$ | 0.1 | 0.1 | 0.1 | 0.1 | 0.1 |
| Triallylisocyanurate | 1.0 | 1.0 | 1.0 | 1.0 | 1.0 |
| TEST RESULTS | | | | | |
| Tensile strength, psi (ASTM 412) | 6420 | 3950 | 1280 | 2540 | 1430 |
| Elongation, % (ASTM 412) | 560 | 520 | 450 | 470 | 450 |
| Secant modulus, psi | 58,000 | 36,000 | 7,600 | 29,000 | 7,400 |

What is claimed is:

1. A composition comprising a blend of (a) a thermoplastic copolymer of vinylidene fluoride and hexafluoropropylene, the copolymer being at least 15% crystalline and (b) a fluoroelastomer copolymer which contains at least about 20% by weight of fluorine and which contains repeating units containing about 30 to 70 mole per cent vinylidene fluoride and about 70 to 30 mole percent hexafluoropropylene, at least one of (a) and (b) being crosslinked.

2. An elongate electrical conductor insulated with a composition comprising a blend of (a) a thermoplastic copolymer of vinylidene fluoride and hexafluoropropylene, the copolymer being at least 15% crystalline and (b) a fluoroelastomer copolymer which contains at least about 20% by weight of fluorine and which contains repeating units containing about 30 to 70 mole per cent vinylidene fluoride and about 70 to 30 mole percent hexafluoropropylene, at least one of (a) and )b) being crosslinked.

3. An elongated electrical conductor in accordance with claim 2 which is a wire.

4. An elongate electrical conductor in accordance with claim 2 which is a cable.

5. A composition comprising a blend of (a) a thermoplastic copolymer of vinylidene fluoride and hexafuoropropylene, the copolymer being at least 15% crystalline and (b) a fluoroelastomer terpolymer which contains at least about 20% by weight of fluorine and which contains repeating units containing vinylidene fluoride, about 5 to 50 mole per cent hexafluoropropylene and about 10 to 35 mole per cent tetrafluoroethylene, at least one of (a) and (b) being crosslinked.

6. A heat recoverable article comprising of composition of claim 1.

* * * * *